US011300345B2

(12) United States Patent
Dresow et al.

(10) Patent No.: US 11,300,345 B2
(45) Date of Patent: Apr. 12, 2022

(54) SHOCK-SURVIVABLE DEWAR

(71) Applicant: MVE Biological Solutions US, LLC, Brentwood, TN (US)

(72) Inventors: Jeffry Dresow, New Prague, MN (US); Paul Lydolph, Faribault, MN (US); Kevin Thissen, Lakeville, MN (US)

(73) Assignee: MVE Biological Solutions US, LLC, Brentwood, TN (US)

( * ) Notice: Subject to any disclaimer, the term of this patent is extended or adjusted under 35 U.S.C. 154(b) by 679 days.

(21) Appl. No.: 15/852,224

(22) Filed: Dec. 22, 2017

(65) Prior Publication Data
US 2018/0180342 A1    Jun. 28, 2018

Related U.S. Application Data

(60) Provisional application No. 62/439,377, filed on Dec. 27, 2016.

(51) Int. Cl.
*F25D 29/00* (2006.01)
*F17C 13/00* (2006.01)
(Continued)

(52) U.S. Cl.
CPC ............. *F25D 3/105* (2013.01); *F17C 3/08* (2013.01); *F17C 13/00* (2013.01); *F25D 29/001* (2013.01);
(Continued)

(58) Field of Classification Search
CPC .. F17C 3/08; F17C 3/085; F17C 13/00; F17C 2201/0109; F17C 2201/0114;
(Continued)

(56) References Cited

U.S. PATENT DOCUMENTS 3,101,862 A * 8/1963 Matsch ............... F17C 3/08
220/560.13
3,666,232 A   5/1972 Melcher et al.
(Continued)

FOREIGN PATENT DOCUMENTS

CN    2449045 Y    9/2001
CN   202442098 U   9/2012
(Continued)

OTHER PUBLICATIONS

International Search Report and Written Opinion for PCT/US2017/068149 dated Apr. 19, 2018.
(Continued)

*Primary Examiner* — Anthony D Stashick
*Assistant Examiner* — Raven Collins
(74) *Attorney, Agent, or Firm* — Snell & Wilmer L.L.P.

(57) ABSTRACT

A dewar for storing a cryogenic fluid features an inner vessel configured to store the cryogenic fluid and an outer vessel having an outer upper head and an outer lower head. The outer upper and lower heads are joined so as to define an interior chamber of the dewar. The inner vessel is positioned within the interior chamber of the outer vessel so that an insulation space, which is evacuated of air, is defined between the inner and outer vessels. A neck extends between the inner vessel and a central region of the outer upper head. The outer upper head and neck are configured so that the central region permanently deforms without breaking the neck when excessive shock loads are applied to the dewar.

20 Claims, 6 Drawing Sheets

(51) Int. Cl.
 *F17C 3/08* (2006.01)
 *F25D 3/10* (2006.01)
(52) U.S. Cl.
 CPC .......................... *F17C 2201/0109* (2013.01);
  *F17C 2203/018* (2013.01); *F17C 2203/0391*
  (2013.01); *F17C 2203/0604* (2013.01); *F17C*
  *2203/0629* (2013.01); *F17C 2203/0646*
  (2013.01); *F17C 2203/0663* (2013.01); *F17C*
  *2203/0673* (2013.01); *F17C 2203/0685*
  (2013.01); *F17C 2205/0196* (2013.01); *F17C*
  *2205/0305* (2013.01); *F17C 2209/2181*
  (2013.01); *F17C 2209/234* (2013.01); *F17C*
  *2221/014* (2013.01); *F17C 2223/0161*
  (2013.01); *F17C 2223/033* (2013.01); *F17C*
  *2260/011* (2013.01); *F17C 2270/01* (2013.01);
  *F17C 2270/0509* (2013.01); *F25B 2700/21*
  (2013.01)
(58) Field of Classification Search
 CPC ...... F17C 2203/0629; F17C 2205/0196; F17C
  2205/0305; F17C 2223/0161
 USPC ......................................................... 220/560
 See application file for complete search history.

(56) References Cited

U.S. PATENT DOCUMENTS 4,572,402 A * 2/1986 Gervais ................ A47J 41/028
  220/560.1
6,029,456 A 2/2000 Zaiser
2002/0125258 A1 9/2002 Kanno et al.
2012/0241226 A1* 9/2012 Bertagnolli ........... E21B 10/567
  175/428

FOREIGN PATENT DOCUMENTS

| CN | 103256481 A | 8/2013 |
| CN | 203743843 U | 7/2014 |
| EP | 0209003 | 1/1987 |
| GB | 1141188 | 1/1969 |
| JP | 47-033923 A | 11/1972 |
| JP | 59-009396 A | 1/1984 |
| JP | 08-150420 A | 6/1996 |
| JP | 2000081199 A | 3/2000 |
| JP | 2007-024057 A | 2/2007 |

OTHER PUBLICATIONS

CN; First Office Action dated Nov. 2, 2020 in Application Serial No. 201780080658X.
CN; Second Office Action dated Jun. 22, 2021 in Application Serial No. 201780080658X.
KR; Notice of Preliminary Rejection dated Dec. 20, 2021 in Korean Application No. 10-2019-7018395.
CN; Notice of Third Office Action dated Nov. 11, 2021 in Chinese Application No. 201780080658.X.
JP; Notice of First Office Action dated Nov. 15, 2021 in Japanese Application No. 2019531723.
AU; 1st Examination Report dated Jan. 27, 2022 in Australian Application No. 2017387025.

* cited by examiner

SHOCK-SURVIVABLE DEWAR

CLAIM OF PRIORITY

This application claims the benefit of U.S. Provisional Application No. 62/439,377, filed Dec. 27, 2016, the contents of which are hereby incorporated by reference.

FIELD OF THE INVENTION

The present disclosure relates generally to cryogenic fluid containers and, in particular, to a dewar featuring a shock-survivable construction.

BACKGROUND

Containers called dewars are used for storage and transport of cryogenic materials at very low temperatures (e.g., liquid nitrogen boils at 77 K or −196 C at normal pressure). They are necessarily constructed with minimal thermal connections, including an evacuated space, between an outer vessel and inner vessel that contains the cryogenic materials (often liquid nitrogen, also called LN2, and some valuable items or matter that must be kept cold by the LN2 as it evaporates from the minor heat leak into the inner vessel from the outside world). The space between the vessels is evacuated to eliminate convective and conductive heat transport.

The only unavoidable connection between inner and outer vessels in a dewar is a neck opening to allow filling and emptying of the inner vessel from the outside world. Preferably, these necks are the only such connection, such that the inner vessel and all its contents are suspended exclusively through that neck attached to the outside vessel's top region.

The dewar necks are beneficially made from low-conductivity materials and are further as thin as possible, to minimize conductive heat leak along the neck. Unfortunately, such low-conductivity materials (e.g., glass-fiber reinforced epoxy resin) are brittle as well. Because they serve as the primary structural connection between inner and outer vessel, these brittle necks can fail, either by breaking or separating at their attachment to the vessels, when the dewar is subjected to shocks such as sudden accelerations or decelerations as can happen during rough handling in shipping or transport.

Such dewar neck failings destroy the vacuum between the inner and outer vessels, leading to a rapid rise in thermal convection between the outside vessel at near-ambient temperature and the cold inner vessel. With that added heat input, any liquid in the inner vessel rapidly boils and can eject a jet of still-cold gas and/or liquid, which is undesirable.

Further, a loss insulating vacuum can mean the loss of the valuable materials in the dewar that are damaged by warming. More specifically, many small dewars are used in shipping and transport applications, such as agricultural semen distribution, transport of laboratory bio-samples, and other temperature-sensitive products. In some cases, where transported materials are rare or unique (e.g., elements of long-term medical studies for cancer); loss of vacuum and those contents is extremely expensive if not catastrophic to the owners of the contents.

In the event of such damage and loss, there is always some question as to whether the shipping company is at fault for mishandling the dewar, or the dewar itself has failed due to a manufacturing or design defect. Providing a more robust dewar which does not fail under most frequently experienced handling loads, but reveals visible indications of loads in excess of standard design and shipping handling allowances, could reduce both losses and the effort and expense of identifying the root cause of such losses.

Indicators of extreme handling of dewars exist in the form of small add-on products. When attached to a package, the product uses a visual indicator showing if the package has tipped from near 90 degrees or greater, or beyond the manufacturers limits. These add-on indicators do not however, register excessive accelerations or decelerations (shock).

There are also add-on indicators of excessive accelerations and decelerations, such as "shock indicators." These add-on indicators have pre-set shock limits based upon the users' requirements, and they utilize a visual display to indicate if a minimum shock limit was exceeded.

These add-on products are very useful and are widely used in the logistics industry. However, these products do nothing to prevent product damage due to the orientation of the package or excessive shock.

SUMMARY

Figure 1:
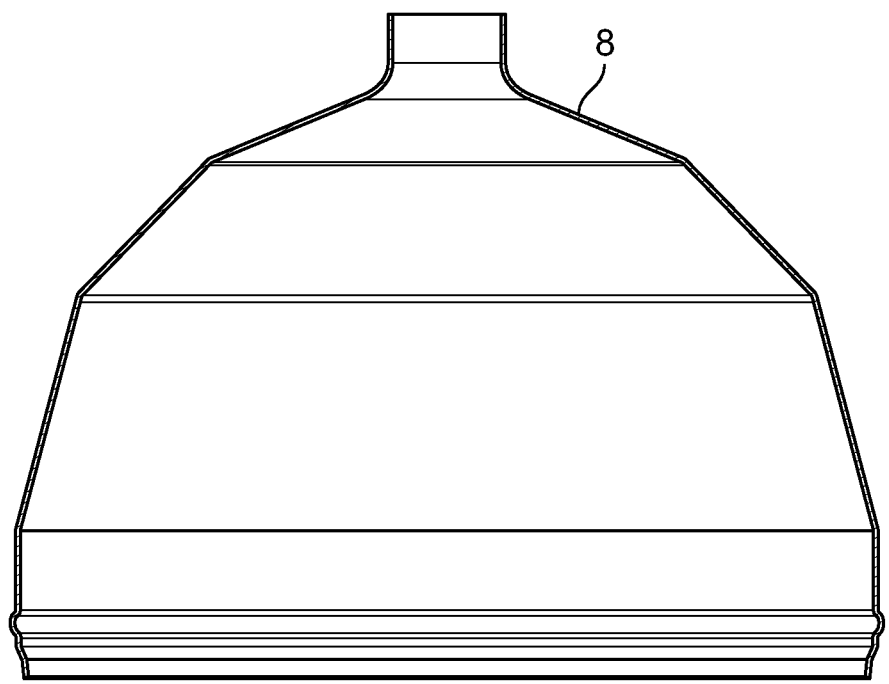
FIG. 1 is a cross sectional view of a prior art outer vessel upper head.

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a dewar for storing a cryogenic fluid includes an inner vessel configured to store the cryogenic fluid. An outer vessel includes an outer upper head and an outer lower head, with the outer upper head including a central region and the outer upper and lower heads joined so as to define an interior chamber. The inner vessel is positioned within the interior chamber of the outer vessel so that an insulation space is defined between the inner and outer vessels, where the insulation space evacuated of air. A neck extends between and is attached to the inner vessel and the central region of the outer upper head. The outer upper head and neck are configured so that the central region permanently deforms without breaking the neck when excessive shock loads are applied to the dewar.

In another aspect, a dewar for storing a cryogenic fluid includes an inner vessel configured to store the cryogenic fluid. An outer vessel includes an outer upper head and an outer lower head, with the outer upper head including a central region and the outer upper and lower heads joined so as to define an interior chamber. The inner vessel is positioned within the interior chamber of the outer vessel so that an insulation space is defined between the inner and outer vessels, where the insulation space evacuated of air. A neck extends between and is attached to the inner vessel and the central region of the outer upper head. The central region of the outer upper head features a shallow dish shape so that it deforms prior to breakage of the neck when the dewar is exposed to a shock load.

In another aspect, an outer vessel upper head for a dewar for storing a cryogenic fluid includes a rim region configured to attach to an outer vessel lower head and a central region attached to the rim region and configured to receive a neck that is adapted to attach to an inner vessel. The central region is configured so that the central region permanently deforms without breaking the neck when excessive shock loads are applied to the outer vessel upper head.

In another aspect, an outer vessel upper head for a dewar for storing a cryogenic fluid includes a rim region configured to attach to an outer vessel lower head and a central region attached to the rim region and configured to receive a neck that is adapted to attach to an inner vessel. The central region features a shallow dish shape so that it deforms prior to breakage of the neck when the outer vessel upper head is exposed to a shock load.

DETAILED DESCRIPTION OF EMBODIMENTS

Prior art dewars are typically constructed of end pieces called 'heads' formed from flat aluminum alloy. The heads are welded to form an inner and an outer vessel, each consisting of an upper head and a lower head, with a neck attached and protruding from the inner vessel's upper head and extending to the outer vessel's upper head. The inner vessel is assembled and welded first. The inner vessel is then wrapped with multi-layer radiant-reflective material and inserted into a partly complete outer vessel. The outer vessel then receives its upper head, which is welded on, so that an interior chamber containing the inner vessel is formed. The final joint between the neck and the outer vessel upper head (typically a collar portion) is then completed using adhesive or other fastening methods known in the art. The insulation space between the inner and outer vessels is then evacuated to complete the thermal isolation of the inner vessel.

Figure 3:
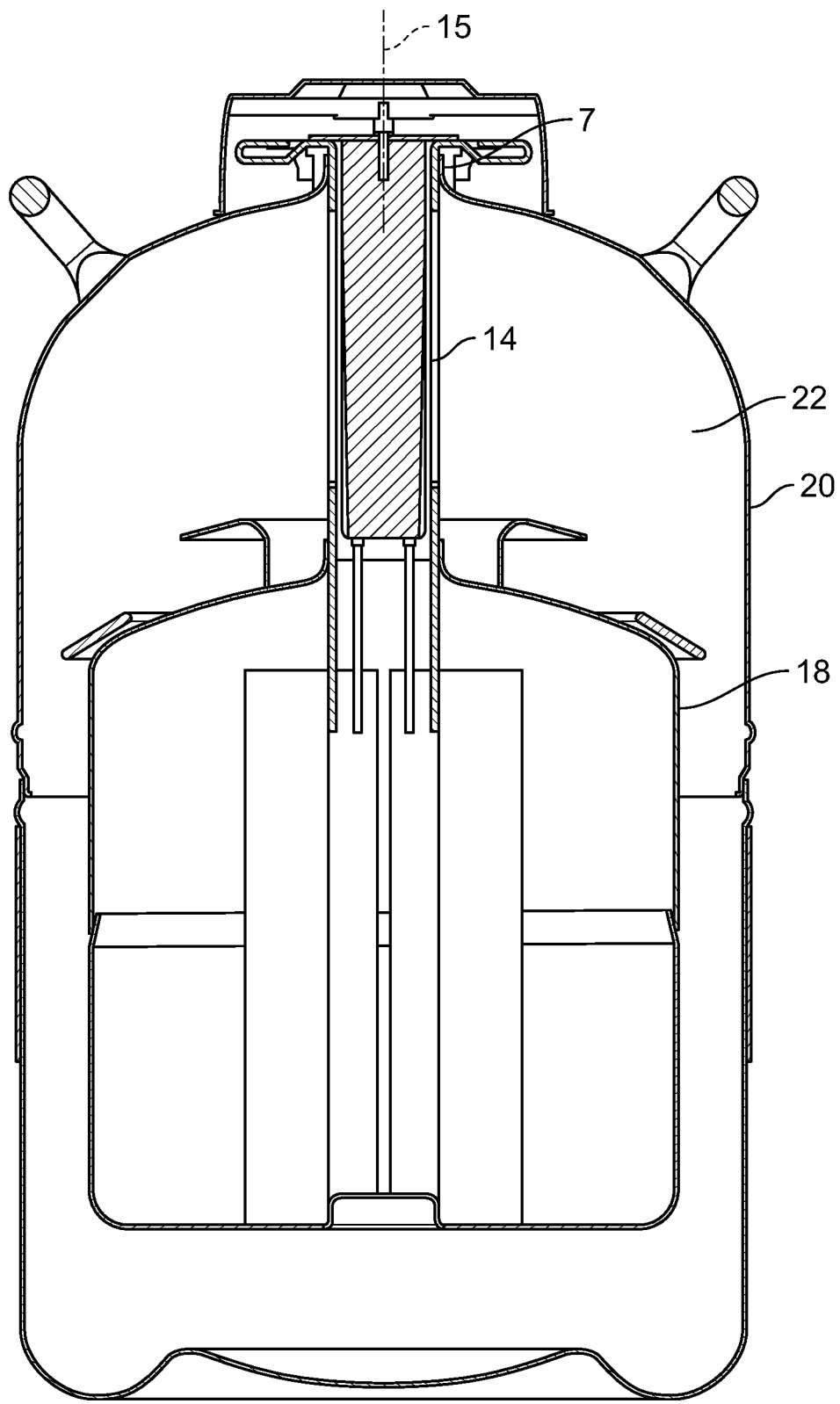
FIG. 3 is a cross sectional side elevational view of a dewar including the outer vessel upper head of FIGS. 2A and 2B in an embodiment of the disclosure.

An embodiment of a dewar constructed in accordance with the present invention is illustrated in FIG. 3 and includes an inner vessel 18 positioned within an outer vessel 20 with an insulation space 22 formed between that is preferably evacuated of air to provide vacuum insulation. A neck 14 extends between the inner vessel 18 and the outer vessel 20 and is secured by its upper end to the collar 17 of the outer vessel upper head. The dewar of FIG. 3 also features additional construction details and features to provide upper head deformation prior to neck breakage as described below.

Finished dewars are typically boxed and may be shipped individually or on pallets to minimize tumbling during shipment. Some of the cryogenic dewars will spend their service life in stationary conditions, while other models are intended for repeated travel through shipping handlers, for the transport of cold, cryogenic materials, with, as an example only, liquid nitrogen inside the dewar, keeping the transported materials cold. These "shipper dewars" may not even be in cardboard boxes, but rather may be handled directly. They may be lifted, slung, tipped, dropped, or banged into other objects. The neck should be strong enough to withstand all such handling in the normal course of usage.

Sometimes, dewar handling includes excessively rough treatment, with shocks or accelerations/decelerations above accepted norms of shipment jostle, as broadly defined by the International Safe Transit Association (ISTA). Although packaging of a product should meet the general guidelines of the ISTA, no cost-effective packaging will protect every product from every possible excessive shock encountered daily in the shipping world.

Prior art dewars are typically made with outer upper heads, an example of which is illustrated in FIG. 1, with high crowns or central regions 8 (deep dishes) to minimize the material required to bear the pressure load of atmosphere against vacuum. Such stamped and spun heads are heavily work-hardened by the 2-step manufacturing process, adding to the strength and rigidity of the head. While beneficial to the pressure loading, this strong rigidity makes the next weakest element in the structure, the attached brittle neck, the most likely failure point when excessively high shock loads are encountered. Yet a broken neck shows no sign of the cause of its demise.

Figure 2A:
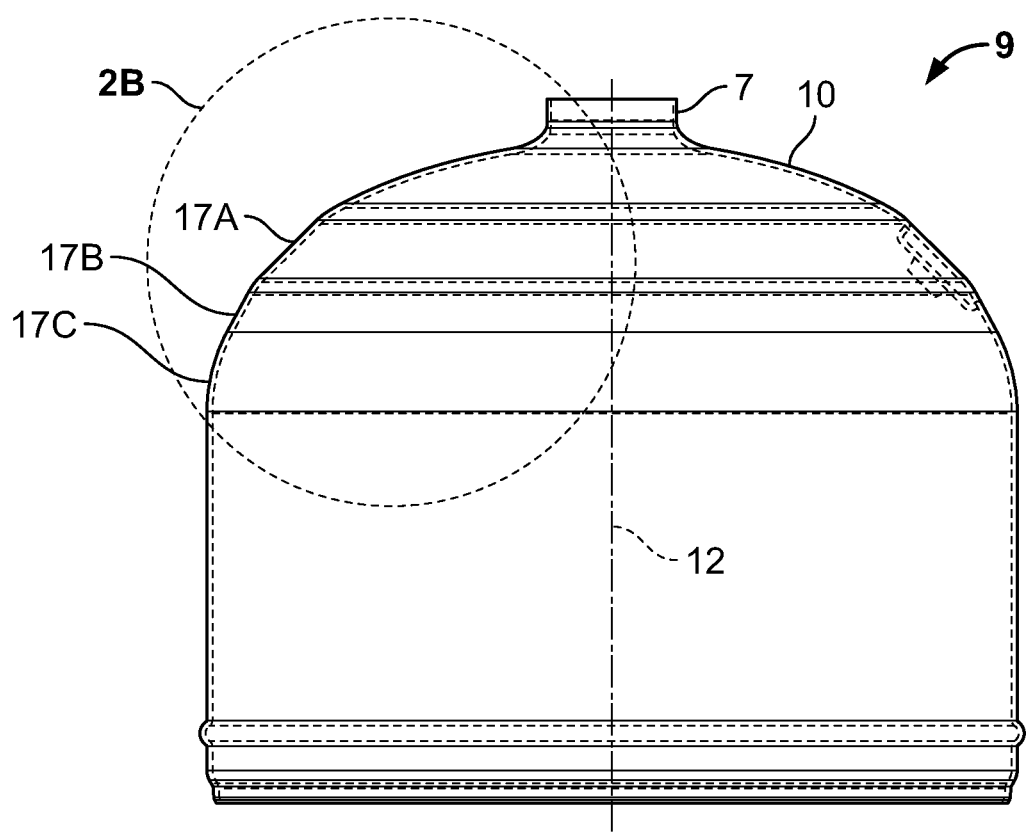
FIG. 2A is a front elevational view of an outer vessel upper head in an embodiment of the invention.
Figure 2B:
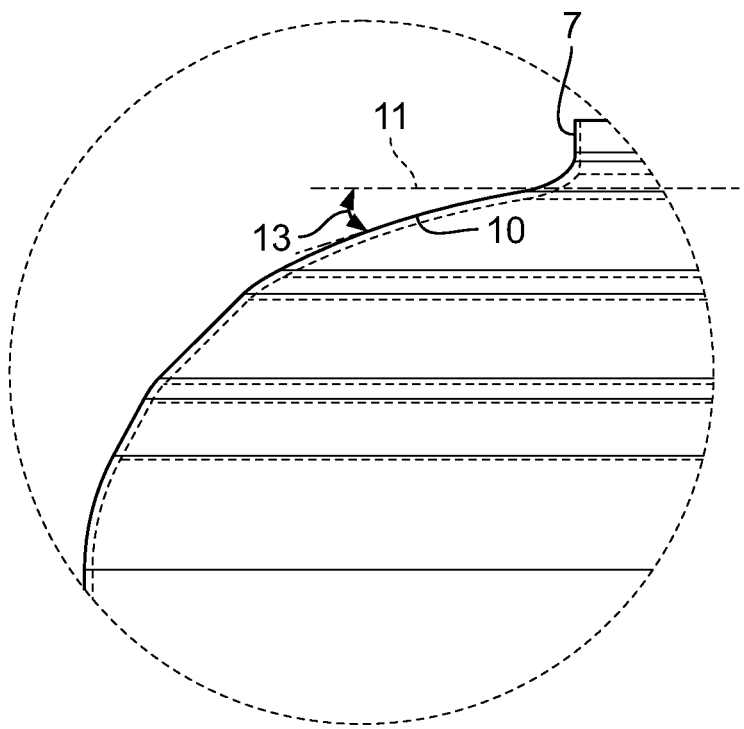
FIG. 2B is an enlarged partial view of the upper head of FIG. 2A.

An outer upper head constructed in accordance with the present invention is indicated in general at 9 in FIG. 2A. The head is preferably fully hydraulic press-formed, producing a lesser and more uniform work-hardening of the material in the central region (or crown) 10 near the neck (surrounding collar 7), where the central region is shaped as a shallow dish. As non-limiting examples only, as illustrated in FIGS. 2A and 2B, the central region 10 may feature an arcuate cross-section and/or may include a portion having an angle (13 in FIG. 2B) less than approximately 23° with respect to the horizontal axis (indicated at 11 in FIG. 2B). The rim regions of the outer upper head (17A, 17B and 17C of FIG. 2A), which circumferentially surround the central region 10, retain their deeper dish shape for resisting pressure loads.

The construction of FIGS. 2A and 2B means the central region 10 of the head is more elastic in a direction along its axis (indicated at 12 in FIG. 2A) or if a torque is applied perpendicular to that axis, the central region can absorb some energy that would otherwise be translated fully to the neck, thus preserving the neck from failing under normally encountered loads.

Figure 5A:
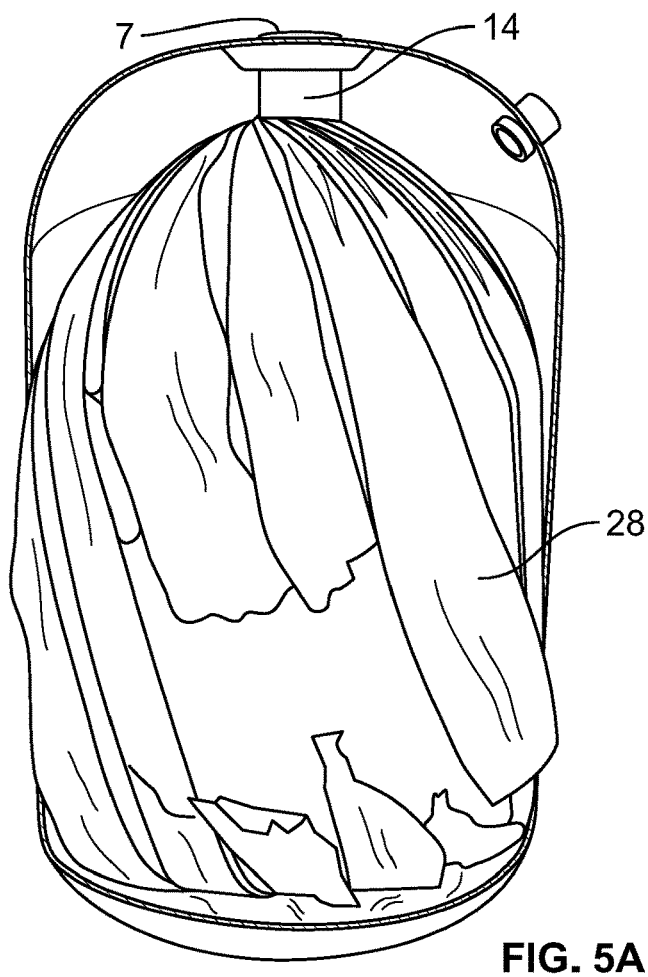
FIG. 5A is a cutaway view of a dewar constructed in accordance with an embodiment of the disclosure that has been subjected to excessive loading along the neck axis.
Figure 5B:
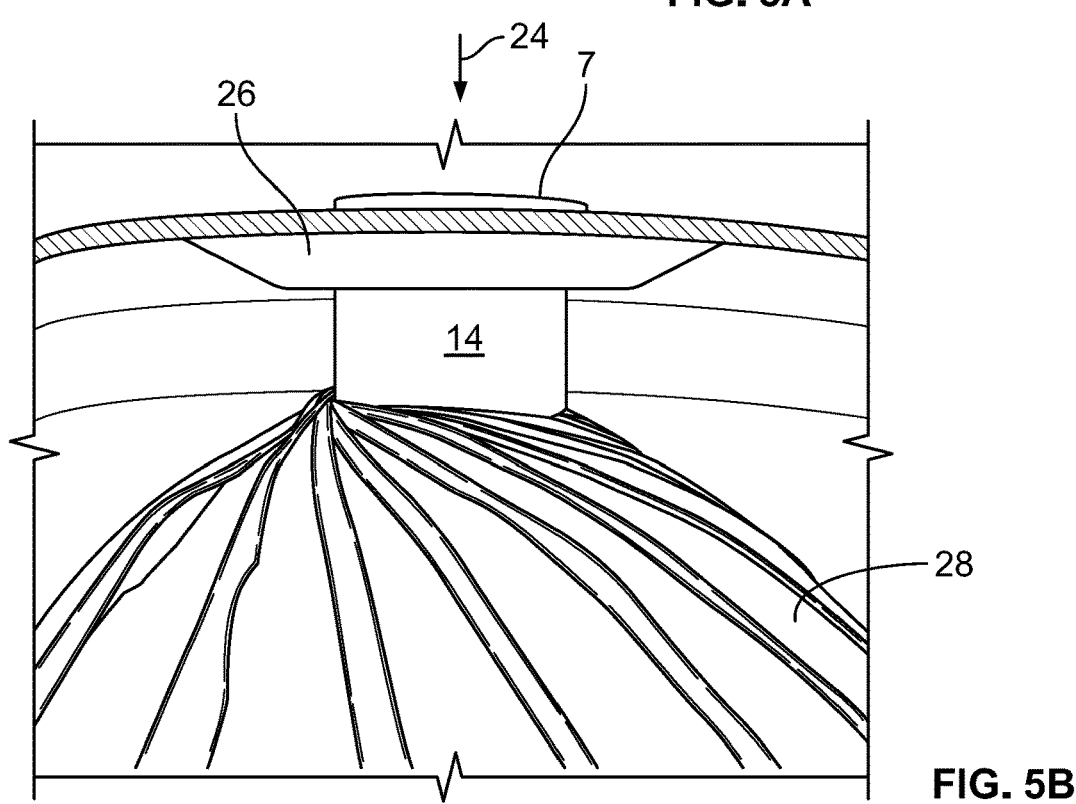
FIG. 5B is an enlarged view of the top portion of the dewar of FIG. 5A.

While such normally encountered loads will not plastically deform the outer head so constructed, the shape and temper of the alloy is chosen so as to induce permanent deformation in the region adjacent to the neck when excessive loads are applied, and still without overloading and breaking the neck (where the neck is indicated at 14 in FIGS. 3 and 5B, and the longitudinal axis of the neck, which is normally aligned with axis 12 of FIG. 2A, is indicated at 15 in FIG. 3). In this way, the vacuum is preserved in all but the most severe loads, but the unit is visibly marked by the permanent deformation, as explained below, to indicate that it has suffered such an excessive shock load. As non-limiting examples only, the outer upper head may be constructed from 5052-0 aluminum and the neck 14 may be constructed of glass-fiber reinforced epoxy resin. The dimensions of FIG. 3 are provided as non-limiting examples only.

Figure 4A:
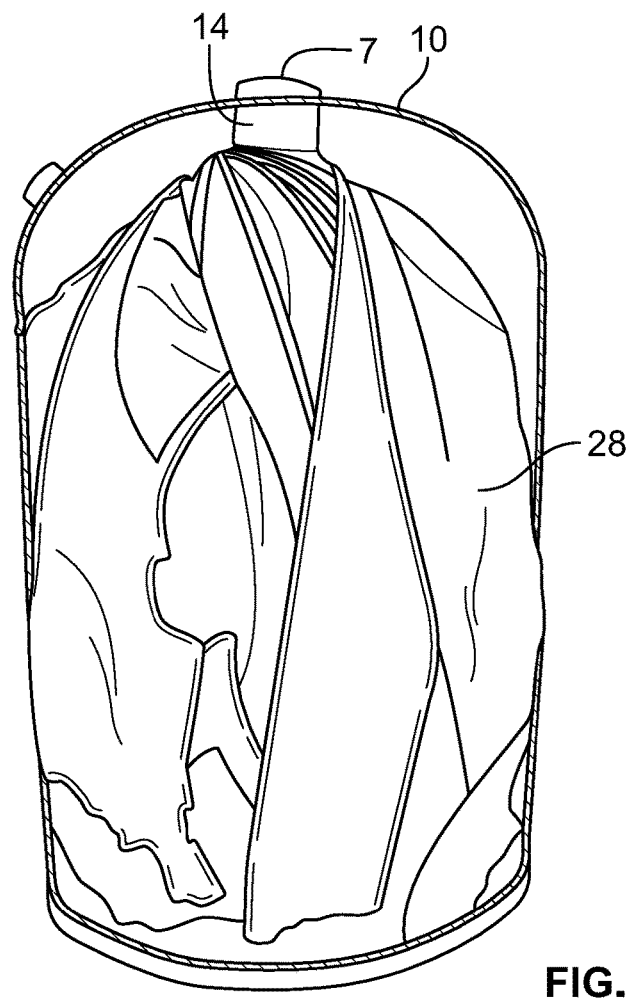
FIG. 4A is a cutaway view of a dewar constructed in accordance with an embodiment of the disclosure that has been subjected to excessive loading perpendicular to the neck axis
Figure 4B:
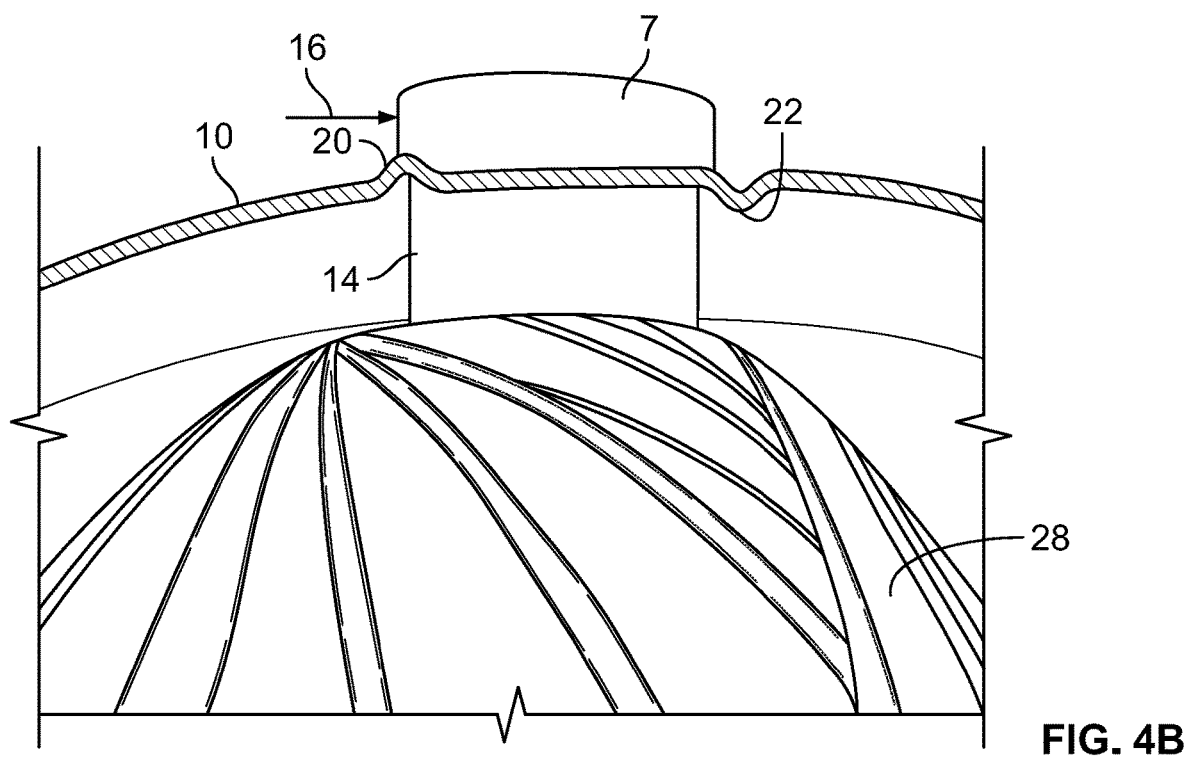
FIG. 4B is an enlarged view of the top portion of the dewar of FIG. 4A.

Examples of the above effects are shown in FIGS. 4A-5B. FIGS. 4A and 4B show a dewar constructed according to the present invention, where the collar 7 of the outer head has been subjected to excessive loading via a force perpendicular to the neck axis (arrow 16 in FIG. 4B). It can be seen there that the central region 10 of the outer head has deformed around the joint between the neck 14 and the collar 7. More specifically, the neck axis (15 of FIG. 3) is no longer aligned on the original head axis (12 in FIG. 2), and the central region material is displaced up on the left (20 in FIG. 4B) and down on the right (22 in FIG. 4B) in the sectioned dewar, relative to the original form.

FIGS. 5A and 5B show a dewar constructed according to the present invention that has been subjected to excessive loading via a force along the neck axis (arrow 24). It can be seen there at 26 that the outer upper head central region material is displaced circumferentially down all around the joint between the neck 14 and the collar 7 (the inner vessel has moved downward relative to the outer vessel).

Each of the deformations of FIGS. 4A-5B is permanent (non-elastic), providing visible evidence from the outside that excessive loads have been applied. Further, in neither case, has the glass fiber neck 14 or its attachments to either vessel suffered any failure, so vacuum was preserved through the damage (prior to the sectioning performed to create FIGS. 4A-5B).

Figure 7:
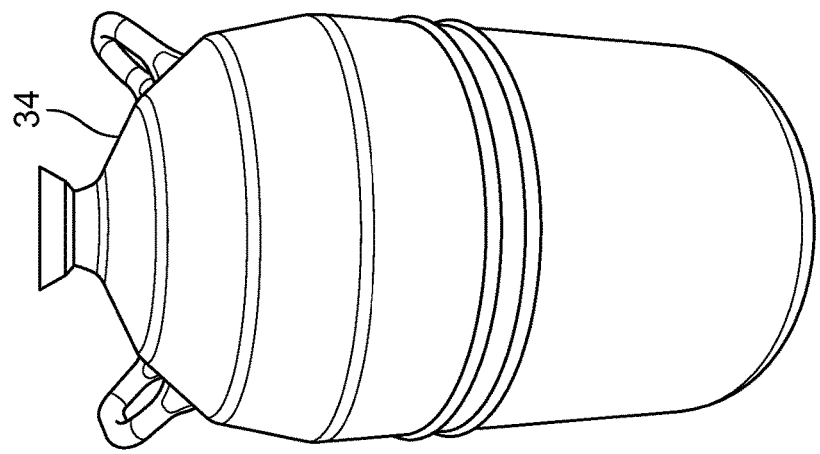
FIG. 7 is a perspective view of a prior art dewar.
Figure 6:
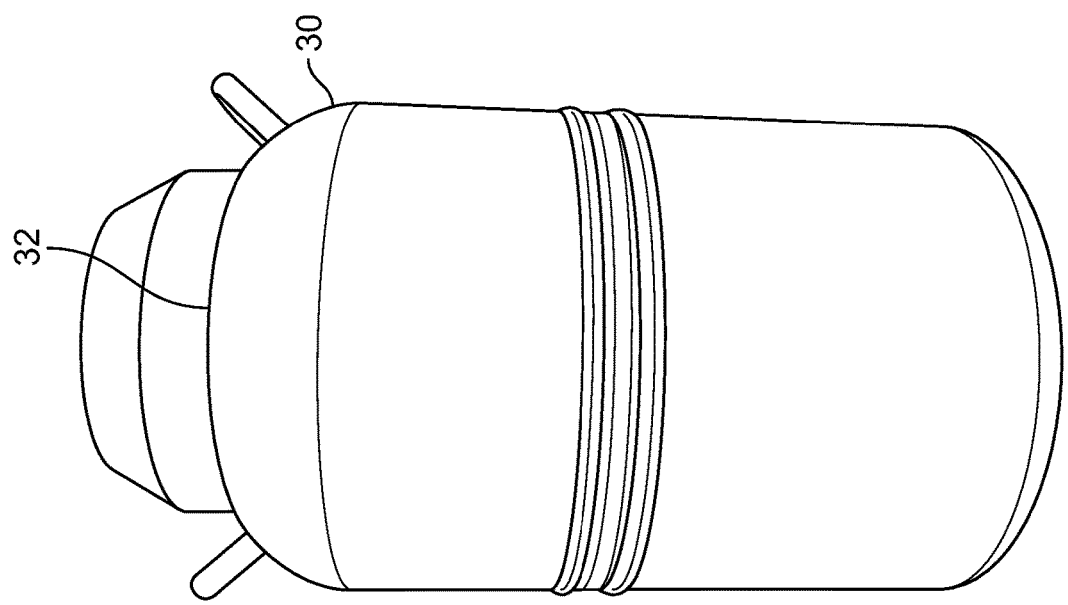
FIG. 6 is a perspective view of a dewar constructed in accordance with an embodiment of the disclosure.

FIG. 6 illustrates an un-sectioned view of an alternative embodiment of a dewar of the disclosure showing the high-shouldered upper head 30 with the arcuate or shallow dish shaped crowning or central region 32. FIG. 7 illustrates a prior art dewar of conventional construction, with a high, stiff upper head central region 34.

The above embodiments provide a dewar with maximum thermal performance as-built, but which can survive a much higher level of shock load without loss of vacuum, and thereby improve both safety and protection of stored materials through such shock loading events. The above embodiments provide a tell-tale indication after any such loading event to make evident to any observer that a dewar has undergone such a heavy loading and should be replaced or retired from transport use.

While the preferred embodiments of the disclosure have been shown and described, it will be apparent to those skilled in the art that changes and modifications may be made therein without departing from the spirit of the disclosure, the scope of which is defined by the following claims.

What is claimed is:

1. A dewar for storing a cryogenic fluid comprising:
an inner vessel configured to store the cryogenic fluid;
an outer vessel including an outer upper head and an outer lower head, the outer upper head including a central region and a collar, the outer upper and lower heads being joined and defining an interior chamber, the inner vessel being positioned within the interior chamber of the outer vessel so that an insulation space is defined between the inner and outer vessels, wherein the insulation space is evacuated of air;
a neck extending between the inner vessel and the central region of the outer upper head; and
wherein the central region deforms around an area that is adjacent to the neck and the collar when excessive shock loads are applied to the dewar.

2. The dewar of claim 1 wherein the outer upper head is fully hydraulic press-formed.

3. The dewar of claim 1 wherein the central region is permanently deformed and visibly indicates when the excessive shock loads are applied to the dewar.

4. The dewar of claim 1 wherein the neck is constructed of glass-fiber reinforced epoxy resin.

5. The dewar of claim 1 wherein the central region of the outer upper head features an arcuate cross-section.

6. The dewar of claim 1 wherein the shock loads include a force parallel to a longitudinal axis of the neck or a force perpendicular to the longitudinal axis of the neck.

7. The dewar of claim 1 wherein the outer upper head is shaped and is composed of a material that induces permanent deformation in the central region when the excessive shock loads are applied without breaking the neck.

8. The dewar of claim 1 wherein the inner vessel includes an inner upper head and an inner lower head that are joined together.

9. The dewar of claim 1 wherein the central region includes has a shallow dish shape.

10. A dewar for storing a cryogenic fluid comprising:
an inner vessel configured to store the cryogenic fluid;
an outer vessel including an outer upper head and an outer lower head, the outer upper head including a central region and a collar, the outer upper and lower heads being joined and defining so as to defining an interior chamber,
the inner vessel being positioned within the interior chamber of the outer vessel so that an insulation space is defined between the inner and outer vessels, wherein the insulation space is evacuated of air;
a neck extending between the inner vessel and the central region of the outer upper head; and
wherein the central region of the outer upper head has a shallow dish shape and forms a convex or a concave deformation around the neck or the collar prior to breakage of the neck when the dewar is exposed to a shock load.

11. The dewar of claim 10 wherein the outer upper head is fully hydraulic press-formed.

12. The dewar of claim 10 wherein the outer vessel is constructed of aluminum alloy.

13. The dewar of claim 10 wherein the neck is constructed of glass-fiber reinforced epoxy resin.

14. The dewar of claim 10 wherein the central region of the outer upper head features an arcuate cross-section.

15. The dewar of claim 10 wherein the shock load includes a force parallel to a longitudinal axis of the neck or a force perpendicular to the longitudinal axis of the neck.

16. The dewar of claim 10 wherein the outer upper head has a shape and is composed of a material that induces permanent deformation in the central region when excessive loads are applied without breaking the neck.

17. The dewar of claim 10 wherein the central region is permanently deformed and visibly indicates when the shock load is applied to the dewar.

18. The dewar of claim 10 wherein the inner vessel includes an inner upper head and an inner lower head that are joined together.

19. An outer vessel upper head for a dewar for storing a cryogenic fluid composing:
a rim region configured to attach to an outer vessel lower head;
a collar that surrounds a neck that is adapted to attach to an inner vessel; and
a central region attached to the rim region and configured to receive the neck that is adapted to attach to the inner vessel, wherein the central region permanently deforms around an area that is adjacent to the neck and the collar without breaking the neck when excessive shock loads are applied to the outer vessel upper head.

20. An outer vessel upper head for a dewar for storing a cryogenic fluid composing:
   a rim region configured to attach to an outer vessel lower head;
   a collar that surrounds a neck that is adapted to attach to an inner vessel; and
   a central region attached to the rim region and configured to receive the neck that is adapted to attach to the inner vessel, wherein the central region has a shallow dish shape and deforms around an area that is adjacent to the neck and the collar prior to breakage of the neck when the outer vessel upper head is exposed to a shock load.

* * * * *